(12) United States Patent
Kolarov et al.

(10) Patent No.: US 10,185,884 B2
(45) Date of Patent: Jan. 22, 2019

(54) MULTI-DIMENSIONAL OBJECTIVE METRIC CONCENTERING

(71) Applicant: Apple, Inc., Cupertino, CA (US)

(72) Inventors: Krasimir D. Kolarov, Cupertino, CA (US); Bjorn S. Hori, Cupertino, CA (US); Rahul Gopalan, Cupertino, CA (US); Steven E. Saunders, Cupertino, CA (US)

(73) Assignee: APPLE INC., Cupertino, CA (US)

(*) Notice: Subject to any disclaimer, the term of this patent is extended or adjusted under 35 U.S.C. 154(b) by 197 days.

(21) Appl. No.: 15/258,501

(22) Filed: Sep. 7, 2016

(65) Prior Publication Data

US 2018/0068195 A1 Mar. 8, 2018

(51) Int. Cl.
| | |
|---|---|
| *G06T 7/77* | (2017.01) |
| *G06K 9/03* | (2006.01) |
| *G06T 7/00* | (2017.01) |
| *G06K 9/62* | (2006.01) |
| *G06K 9/00* | (2006.01) |

(52) U.S. Cl.
CPC ......... *G06K 9/036* (2013.01); *G06K 9/00577* (2013.01); *G06K 9/6201* (2013.01); *G06K 9/628* (2013.01); *G06T 7/0002* (2013.01); *G06T 7/0018* (2013.01); *G06T 7/0081* (2013.01); *G06K 2009/6213* (2013.01); *G06T 2207/10016* (2013.01); *G06T 2207/10024* (2013.01); *G06T 2207/30168* (2013.01)

(58) Field of Classification Search
CPC .. G06K 9/036; G06K 9/00577; G06K 9/6201; G06K 9/628
See application file for complete search history.

(56) References Cited

U.S. PATENT DOCUMENTS

| | | | | |
|---|---|---|---|---|
| 6,363,116 B1* | 3/2002 | Edwards | ............... | H04N 17/00 348/E17.003 |
| 6,577,764 B2* | 6/2003 | Myler | ................... | G06T 7/0004 348/180 |
| 7,733,372 B2* | 6/2010 | Ong | ..................... | H04N 17/004 348/180 |
| 8,355,342 B2* | 1/2013 | Yamagishi | .......... | H04N 17/004 370/252 |
| 8,508,597 B2* | 8/2013 | Bourret | ................... | G06T 7/001 348/180 |
| 8,645,119 B2* | 2/2014 | Och | ................... | G06F 17/2845 704/2 |

(Continued)

*Primary Examiner* — Gregory M Desire
(74) *Attorney, Agent, or Firm* — Baker & Hostetler LLP (57) ABSTRACT

A video quality assessment method may include frame-by-frame analysis of a test video sequence (often compressed) with its original (reference) counterpart, pre-conditioning elements of the test and reference frames, defining a region of interest in the pre-conditioned test frame and estimating relative errors within the region of interest between the test and reference frame, filtering the estimated errors of the region of interest temporally across adjacent frames within a perpetually relevant time window, aggregating the filtered errors within the time window, ranking the aggregated errors, selecting a subset of the ranked errors, aggregating across the selected subset of errors, and inputting said aggregated error to a quality assessment system to determine a quality classification along with an estimated quality assessment.

33 Claims, 7 Drawing Sheets

(56) References Cited

U.S. PATENT DOCUMENTS

| | | | | |
|---|---|---|---|---|
| 8,743,291 | B2* | 6/2014 | Li | G06T 5/009 |
| | | | | 345/603 |
| 9,225,962 | B2* | 12/2015 | Au | G06T 7/0002 |
| 2007/0216809 | A1* | 9/2007 | Pirzada | H04N 17/02 |
| | | | | 348/582 |
| 2008/0201348 | A1* | 8/2008 | Edmonds | G06Q 30/02 |
| 2009/0153668 | A1* | 6/2009 | Kim | H04N 17/004 |
| | | | | 348/180 |
| 2013/0027615 | A1* | 1/2013 | Li | H04N 17/02 |
| | | | | 348/571 |
| 2014/0337328 | A1* | 11/2014 | Sarvabhotla | G06F 17/30867 |
| | | | | 707/723 |
| 2016/0227165 | A1* | 8/2016 | Moorjani | H04N 7/15 |
| 2016/0329078 | A1* | 11/2016 | Park | G11B 20/00007 |
| 2018/0025749 | A1* | 1/2018 | Oh | G06K 9/6218 |
| | | | | 386/278 |
| 2018/0068195 | A1* | 3/2018 | Kolarov | G06K 9/036 |

* cited by examiner

MULTI-DIMENSIONAL OBJECTIVE METRIC CONCENTERING

BACKGROUND

The present disclosure relates to coding video and analytical techniques to assess the quality of video obtained from coding and decoding operations.

Computers may employ a variety of objective metrics to assess the quality of video content and to help select video coding and processing parameters. These objective metrics typically focus on pixel differences across a frame, comparing source images to their counterparts after coding and decoding operations have been performed, or test video to reference video, and then sum or average the evaluated differences. Some examples of these objective metrics include, but are not limited to, Mean-Squared-Error (MSE) and Sum-of-Absolute Differences (SAD). Other more complex video quality metrics consider other statistical properties, human visual systems models, common coder/decoder distortion artifact models, and transformations between pixel and spatial frequency domains to isolate regions of interest for analysis.

Objective video quality metrics may not always correlate well with human subjective quality assessment of the same video for a number of reasons. A video may have significant artifacts from a full-reference pixel-difference perspective (MSE, SAD), but these artifacts may be difficult or impossible for a human viewer to observe if conditions are not favorable. Examples of unfavorable conditions include insufficient contrast ratio, extremes in light intensity (too dark or too bright), non-uniform content of the scene (e.g., water or clouds), and lacking familiar structural components (e.g., lines, edges, people, etc.), the artifact feature size is too small given the display resolution and/or viewing distance, the artifact did not persist in time long enough—collectively such conditions might lead to a relatively high subjective quality assessment despite the artifacts. Conversely, a video may have relatively few or relatively minor artifacts from a full-reference pixel-difference perspective, but these artifacts may be highly observable and objectionable if they exist for a sufficient period of time and are present on a focal object (e.g., a person's face)—such a video might lead to a relatively low subjective quality assessment despite relatively minor artifacts. Improvements in the correlation between objective video quality metrics and human subjective quality assessment have the potential to drive improvements in underlying video compression technologies, network bandwidth utilization, mobile device energy and resource utilization, and ultimately user experience with video related products and services.

Accordingly, what is needed is a system and method for improving objective video quality metric correlation to subjective metrics.

DETAILED DESCRIPTION

A video quality assessment method including, for each frame of a reference video sequence and a test video sequence, pre-conditioning elements of the frames; defining a region of interest in the pre-conditioned frames of the test sequence, estimating error within the region of interest, filtering the estimated errors of the region of interest temporally across adjacent frames within a time window, aggregating the filtered coding errors within the time window, ranking the aggregated errors, selecting a subset of the ranked errors as an aggregate error score for the test video sequence, and determining at least one of the following with an error assessment system based on the selected subset of the ranked errors: a quality classification and a quality assessment. This way, a system and/or architects of a system can improve the quality and efficiency of video output by using parameters which best correlate to a human viewer's perception. Instead of wasting resources to perform operations whose output may not be noticed by a human viewer, the method and system can more efficiently apply resources in ways that enhance the viewing experience.

Figure 1:
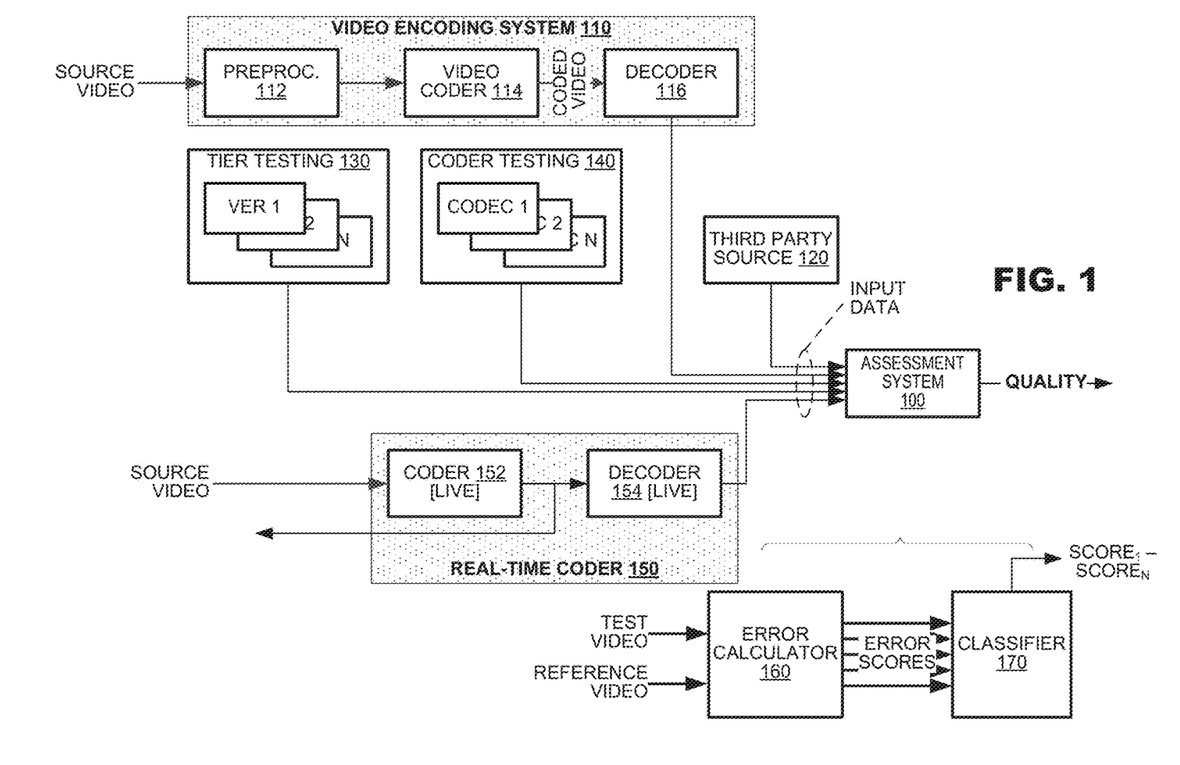
FIG. 1 is a simplified block diagram of a system according to the present disclosure.

The principles of the present disclosure find application in an assessment system 100 as illustrated in FIG. 1. The assessment system 100 may receive input video data and may perform a quality assessment of that video. The input video data may be presented to the assessment system 100 from a variety of sources. The assessment system 100 may output data identifying a quality ranking of the input video (e.g., "good" or "poor") and, optionally, statistics quantitatively identifying quality scores, either of the video as a whole or on a segment-by-segment basis.

In one embodiment, the assessment system 100 may receive video data from a video encoding system 110, which may include a preprocessor 112, a video coder 114 and a video decoder 116. The preprocessor 112 may perform processing operations on a source video sequence to condition it for coding. The video coder 114 and video decoder 116 may compress then decompress the source video sequence according to a predetermined coding protocol. Decoded data obtained from the video decoder 116 may exhibit certain losses of video information. The assessment system 100 may measure quality of decoded video data and/or other video data in lossless coding schemes to assess the likely subjective quality of the video data.

In another embodiment, the assessment system 100 may receive input video from a third party source 120. For example, the input video may be submitted to a proprietor of a video distribution system for mass distribution. The proprietor of the video distribution system may process the input video by the assessment system 100 to determine whether video quality of the input video meets the proprietor's standards for such videos. In an embodiment, the assessment system 100 may output data identifying portions of the input video, if any, that are deemed to have low quality, which the third party may use in re-coding and/or re-processing its video data.

In a further embodiment, the assessment system 100 may receive input video(s) from a tier testing system 130. For example, many video distribution systems define "service tiers" for coded video that are delivered to their video consumers. The service tiers typically relate to specific parameters of coded video data at a high level by, for example, specifying frame resolution, frame rate and/or bit rate constraints that must be met by video data. Producers of video often have a variety of different coding parameters available to them to code their videos and meet the requirements of a given service tier. In an embodiment, the assessment system 100 may receive input videos representing video data that has been coded, then decoded according to different combinations of the coding parameters. From the output of the assessment system 100, producers of the video may determine which combination of parameters yields the highest video quality while still meeting requirements of a given service tier.

In another embodiment, the assessment system 100 may receive input video(s) from a coder testing system 140. For example, video compression organizations may test different coding techniques to assess their competitive advantages and disadvantages in response to certain elements of source video. The coder testing system 140 may have a plurality of coder/decoder ("codecs") 1-N that code and decode common source video according to different techniques. The decoded data obtained from these different techniques may be submitted to the assessment system 100 for evaluation.

In a further embodiment, the assessment system 100 may work cooperatively with a real-time coding system 150. In this application, the real-time coding system 150 may code source video data 152 and distribute the coded video data immediately. A decoder 154 may decode the coded video data an input the decoded video data to the assessment system 100. The assessment system 100 may generate quality assessments from the decoded video data. Such an embodiment would find application in "live" video delivery applications where there is insufficient time to recode video data when quality impairments are identified. In this case, the quality data generated by the assessment system 100 may be reviewed at the conclusion of a video coding event and used to set coding parameters of other video coding events that may occur in the future.

The assessment system 100 may generate ratings data represented a calculated assessment of the quality of video data input to it. The ratings could include numeric scores and/or qualitative assessments such as "good," "fair," and "poor." The ratings may also include a "PASS" or "FAIL" recommendation corresponding to whether or not the coded video should be output based on its quality, or whether or not the parameters used on the video data should be used again. In one embodiment, the assessment provided by the assessment system 100 may be used in real-time to improve the quality of the video data. In such an embodiment, video data may not be output until the assessment system 100 releases it based on the quality assessment.

The assessment system 100 may also measure types of error other than coding error. For example, the assessment system 100 may detect raw YpCbCr or RGB color space picture elements in a file container such as a .AVI file in lossless-uncompressed coding, and/or Motion JPEG-2000 elements in lossless-compressed coding. Video coded in a lossless scheme might, upon reconstruction, have spatially localized or global frame errors due to bitstream errors caused by transmission errors over a non-error correcting network, storage on a non-error correcting storage or memory device, and the like. For example, broadcast digital television may incur transmission-related errors which render small or large portions of video frames using "error concealment" methods that may appear to a viewer as stationary blocks.

Adaptive HTTP delivery methods may also be implemented with the assessment system 100. In HTTP Live Streaming (HLS), a video may be compressed in a lossy mode at multiple different bitrates and related quality tiers (e.g., high-quality tiers for high bitrates and low-quality tiers for low bitrates). The tiers delivered and rendered to a viewer may be a function of the available instantaneous bandwidth to deliver the compressed video. When higher bandwidth is available, a higher tier may be delivered and rendered. Likewise, when lower bandwidth is all that is available, a lower quality tier may be delivered and rendered. The assessment system 100 may assess the video quality subject to bitrate and quality changes on segment boundaries that model the actual experiences of users gathered by one or more quality logging systems. The quality assessment taken with the outputs of the quality logging systems may be used to derive a relationship among available bandwidth, HLS segment selection, and video quality. Such a relationship may be helpful to system/service design architects in determining under which conditions video quality is acceptable.

The assessment system 100 may also include an error calculator 160 and a classifier 170. The error calculator 160 may receive video from the decoder 116, third party source 120, tier testing system 130, coder testing system 140, real-time coding system 150, and/or other video streams. The error calculator 160 may compare the received video with reference video to determine one or more error scores representing the quality of the video data. The one or more error scores may be passed to a classifier 170 as inputs.

The classifier 170 may perform a quality assessment of the video data based on the received error scores. For example, the classifier 170 may determine and output some combination of numeric values representing Estimated Mean Opinion Scores, PASS/FAIL classifications, and various statistics related to the quality assessment of the video data. The classifier 170 may perform its quality assessment by several techniques, including Random Forest analysis, Support Vector Machine analysis, k-Nearest Neighbors analysis, and an Artificial Neural Network analysis. In one embodiment, the classifier 170 may use each of these techniques in parallel. Based on the received error scores representing video quality measurements, the classifier 170 may output quality scores $Score_1$-$Score_N$ from its evaluation according to the respective techniques.

Figure 2:
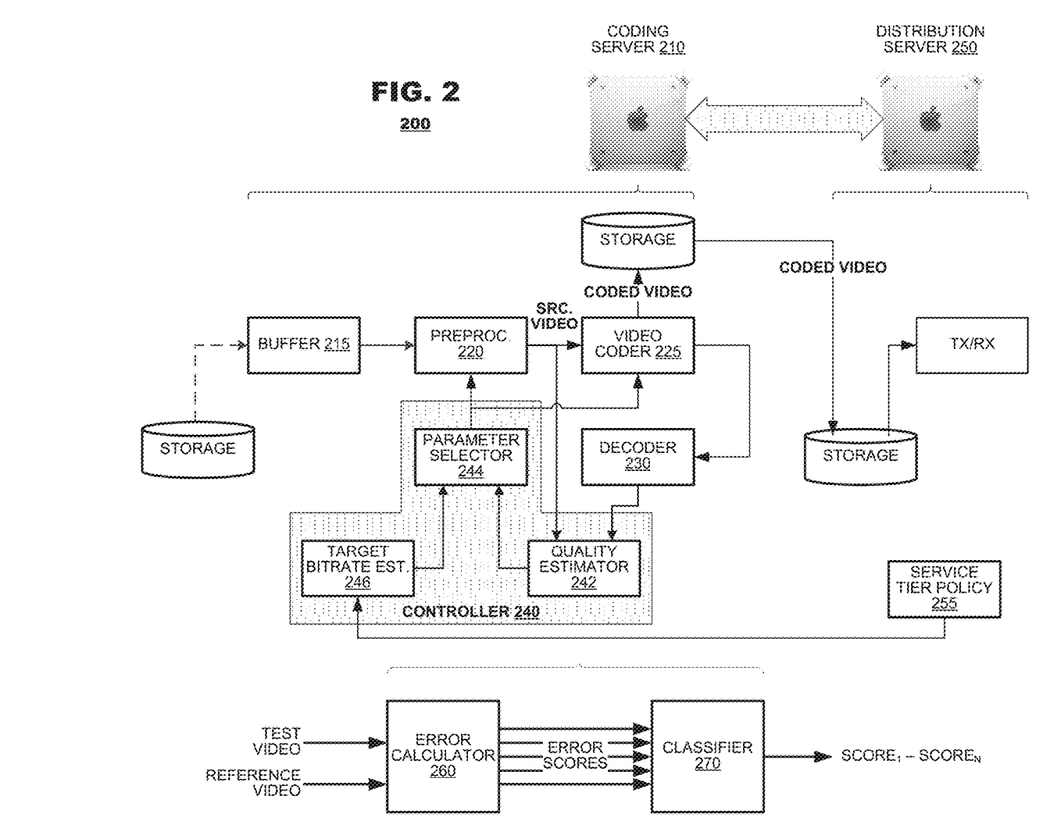
FIG. 2 is a simplified block diagram of a system according to the present disclosure.

FIG. 2 is a simplified block diagram of a system 200 according to an embodiment of the present disclosure. The system 200 may include a coding server 210 and a distribution server 250. The coding server 210 may code a source video sequence for delivery to client devices (not shown). The distribution server 250 may store the coded video data and may transmit the coded video data to the client device(s) upon request. The principles of the present disclosure find application with such a system, in which coded video data may be validated prior to being released to a distribution server 250 and, by extension, being released to client devices.

The coding server 210 may include an input buffer 215, a preprocessor 220, a video coder 225, a decoder 230 and a controller 240. The input buffer 215 may receive video data that is to be coded. The preprocessor 220 may perform operations on the video data that condition the video data for coding. The video coder 225 may perform data compression operations on the video data. The video decoder 230 may invert the data compression operations performed by the video coder 225.

The controller 240 may control operations of the coding server 210. As is relevant to the present discussion, the controller 240 may assess quality of the coding/decoding operations performed by the video coder 225 and the video decoder 230. The controller 240 may determine whether coding operations performed on source video yield coded video data that will possess sufficient coding quality when it is decoded. The controller 240 may validate coded video for release or, alternatively, cause coded video data to be recoded because it does not generate coded video data with sufficient quality. In an embodiment, the controller 240 may operate on coded video data that has been segmented into predetermined durations (say, 5 or 10 second portions of video data) and, therefore, the controller's validation decisions may be performed on a segment-by-segment basis.

The input buffer 215 may receive input video from any number of sources, for example, cameras or other storage devices. For example, source video may be provided as pre-produced video content (e.g., movies, television or other programming) or synthetic video content (e.g., animated content from cartoons or computer applications such as games), in which case, the source video may be stored in another storage device or a server. In another example, source video may be provided as natural content, which may be captured by a camera and input to the coding system 200 by a direct feed. The principles of the present disclosure apply equally well to these different use cases.

The preprocessor 220 may alter parameters of the video sequence prior to compression. For example, the preprocessor 220 may alter frame rate and/or resolution of the source video to meet requirements of a coding session. The preprocessor 220 also may employ various filtering and/or image correction processes (brightness/contrast correction) to reduce frame-to-frame variations in the source video. Filtering can be accomplished using temporal, spatial, or spatial-temporal filters, for example.

The video coder 225 may apply data compression operations to the video sequence from the preprocessor 220. The video coder 225 may operate according to a predetermined coding protocol such as the MPEG, H.263, H.264 and/or HEVC (H.265) families of coding standards. Video coding typically exploits temporal and/or spatial redundancy in video data for which several types of coding are available. Frames of video may be parsed into sub-units, called "pixel blocks" for convenience, which are processed on a pixel block-by-pixel block basis. A pixel block may be coded according to intra-mode prediction (also called I-mode coding), in which the element is coded differentially with respect to another pixel block of the same frame. Alternatively, the element may be coded according to inter-mode prediction, in which case the pixel block is coded differentially with respect to other pixel block(s) from one (P-mode coding) or a pair (B-mode coding) of previously-coded frames. In either case, the input differential coding yields prediction residuals, representing a pixel-wise differences between the input pixel block and its predicted pixel block(s), which may be processed according to other coding stages, including quantization, which truncates data values and induces losses.

The video coder 225 may apply coding parameters to different elements of the video sequence, including, for example, a coding mode selection and quantizer parameter selection. The coding mode selection may select a coding mode to be applied to a frame being coded, for example, whether to code an input frame as an I-frame, P-frame or B-frame. The quantizer parameter selection may select a quantization parameter to apply to transform coefficients (or other data) to truncate these data elements prior to entropy coding and transmission.

The video decoder 230, as indicated, inverts coding operations of the video coder 225 and recovers decoded video data from coded video data output by the video coder 225. The video decoder 230 also may operate on a pixel block-by-pixel block basis, and may invert the entropy coding, quantization, transform and prediction operations performed by the video coder 225. The video decoder 230 additionally may perform in-loop and post-loop filtering operations to enhance quality and/or fidelity of the reconstructed video. The video decoder 230 may output the decoded video frames to the controller 240 for use in quality assessments. The video decoder 230 also may store reconstructed video data of frames that are designated as "reference frames," which become available for use as sources of prediction in coding new frames that are presented to the video coder 225.

The controller 240 may provide a degree of control over coding operations performed by the video coder 225. For example, the controller 240 may select coding parameters to be applied by the video coder 225 in performing its coding operations, either directly or by identifying parameters as a range within which the video coder 225 must operate. The controller 240 may estimate a target bitrate that is to be achieved by coded video data output by the video coder 225 and may constrain the video coder 225 to apply other coding parameters, such as coding mode, to satisfy coding policies to which the coding server 210 adheres. And, if the controller 240 determines that quality of decoded video does not meet predetermined quality metrics, the controller 240 may revise its selection of coding parameters and cause the video coder 225 to recode a previously-coded portion data to improve the coding quality of that portion.

FIG. 2 illustrates sub-units corresponding to processes performed by the controller 240—a quality estimator 242, a parameter selector 244 and a target bitrate estimator 246. The parameter selector 244 may generate parameter data to the preprocessor 220 and/or video coder 225 to govern their operation. The parameter selector 244, for example, may cause the preprocessor 220 to alter the data output to the video coder 225. The parameter selector 244 may impose coding modes and/or quantization parameters to the video coder 225. The parameter selector 244 may select the coding parameters at least in part based on bit rate estimates received from the target bitrate estimator 246, based on complexity estimates of the source video, based on the correlation of coding parameters to estimates of subjective metrics such as Mean Opinion Scores and Differential Mean Opinion Scores, and based on other determinations about video quality.

The target bitrate estimator 246 may estimate a target bitrate that is to be achieved by the video coder 225, which may be derived from data representing service tier(s) that the distribution server 250 maintains. The parameter selector 244 may select the coding parameters to be applied during video coding from the estimated target bit rate, other policy constraints and quality indications output by the quality estimator 242.

The quality estimator 242 may estimate quality of coding achieved by the video coder 225 from a comparison of decoded video data output by the video decoder 230 and source video processed by the video coder 225 (alternatively, video data input to the pre-processor).

In one embodiment, the quality estimator 242 may include an error calculator 260 and a classifier 270. The error calculator 260 may receive the reference video along with test video. The error calculator 260 may compare the reference video with the test video to determine one or more error scores representing the quality of the video data. The one or more error scores may measure coding error and/or other types of error/artifacts, and may be passed to a classifier 270 as inputs.

The classifier 270 may perform a quality assessment of the video data based on the received error scores. For example, the classifier 270 may determine and output some combination of numeric values representing Estimated Mean Opinion Scores, PASS/FAIL classifications, and various statistics related to the quality assessment of the video data. The classifier 270 may perform its quality assessment by several techniques, including Random Forest analysis, Support Vector Machine analysis, k-Nearest Neighbors analysis, and an Artificial Neural Network analysis. In one embodiment, the classifier 270 may use each of these techniques in parallel. Based on the received error scores representing video quality measurements, the classifier 270 may output quality scores $Score_1$-$Score_N$ from its evaluation according to the respective techniques.

Figure 3:
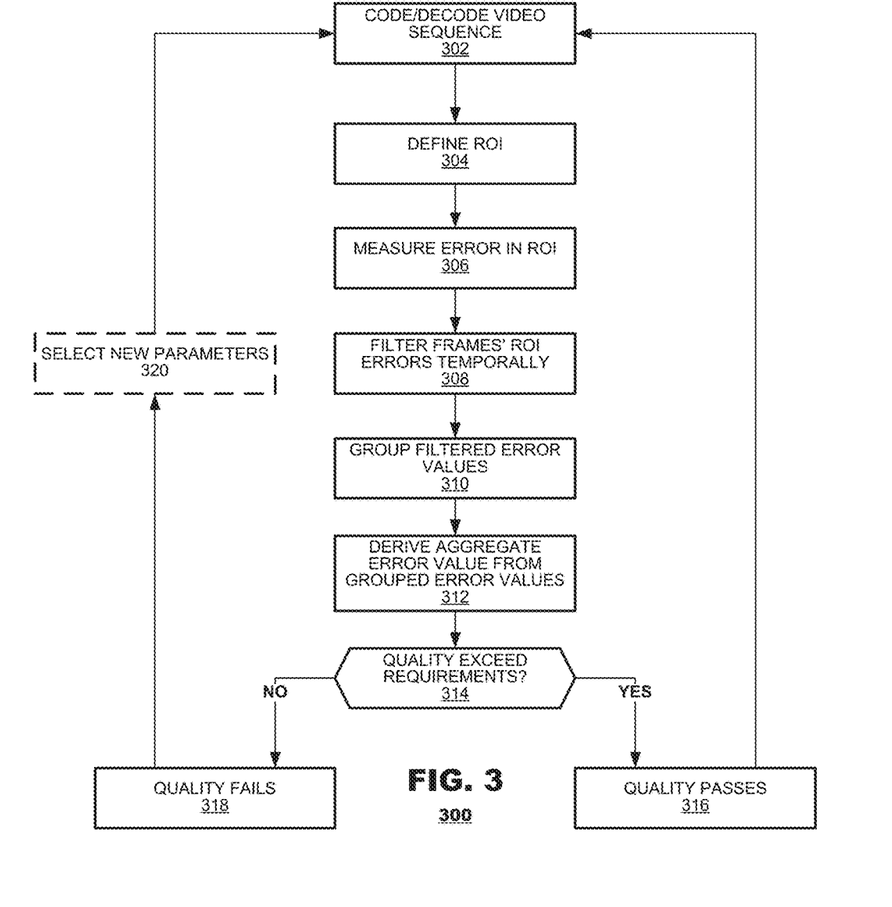
FIG. 3 illustrates a method for assessing quality of video according to the present disclosure.

FIG. 3 illustrates a method 300 for assessing quality of video according to an embodiment of the present disclosure. The method 300 may begin by coding a test video sequence of a video frame according to a first set of coding parameters, then decoding the test video sequence (box 302). For each frame in the test video sequence, the method 300 may define one or more regions of interest (box 304), and may measure errors in each region of interest (box 306). At the conclusion of operation of box 306, the method 300 may generate data representing error values at each pixel for each frame of the identified ROIs. The method 300 may filter the errors at these pixel locations temporally (box 308). The method 300 may group frames by ranking them according to error values of the ROIs (box 310). The method 300 may derive an aggregate quality score from the group of frames (box 312) and may compare the quality score to a threshold defining quality requirements to determine if the quality of the video is sufficient (box 314). If the quality score exceeds the quality requirements threshold, the video sequence may be given a passing grade (box 316). If not, the video sequence may be given a failing grade (box 318). In an embodiment, new parameters may be selected (box 320), and the method 300 may be repeated when a video fails to meet the quality requirements threshold.

The video sequence may be coded with an initial set of coding parameters (box 302). As indicated, coding may occur according to any of the MPEG, H.263, H.264 and HEVC (H.265) families of coding standards. The initial coding parameters may be selected from default coding parameters which are pre-set by a system or user. The initial coding parameters may be derived from bit rate estimates provided by other system components, such as a distribution server 250 (FIG. 2). The initial coding parameters also may be set from a dynamic analysis of source video, which may include complexity estimates of the video.

Alternatively, the initial coding parameters may be based on evaluation of previously-used coding parameters. For example, the applied coding parameters may be determined based on past coding experience. If certain coding parameters have provided sufficiently high quality coding for a video stream of a particular complexity, the method 300 may adopt such coding parameters for the initial coding of subsequent video streams. Adopting coding parameters may be based on scaling. For example, coding parameters with sufficiently high quality coding may be given a higher weight than coding parameters with lower quality. Which coding parameters are adopted may be based on the weight assigned to the coding parameters.

ROIs may be defined (box 304) according to a variety of techniques. In one embodiment, the method 300 may perform face detection to identify the location(s) of faces within image content of each frame. When face(s) are detected in image content, the method 300 may define the ROI as rectangle(s) that circumscribe the respective faces. In some applications, face detection identifies a geometric shape that captures a limited set of facial attributes such as the eyes, nose and mouth of a person; in such cases, the method 300 may expand the geometric shape to include other features, such as the outline of the head, the hair, shoulders and torso of each person in the image. These ROIs may form the basis of error measurements in box 306. A frame may be cropped so that the face is at a pre-determined fixed position.

ROI definition also may be performed by other types of object detection, such as body detection or detection of predetermined objects that are defined for the controller 240.

In another embodiment, an ROI may be defined from identification of frame content that represents skin tone. A frame, either a source frame or a decoded frame, can be processed to detect whether it contains image content having color(s) representative of skin tone.

Figure 4A:
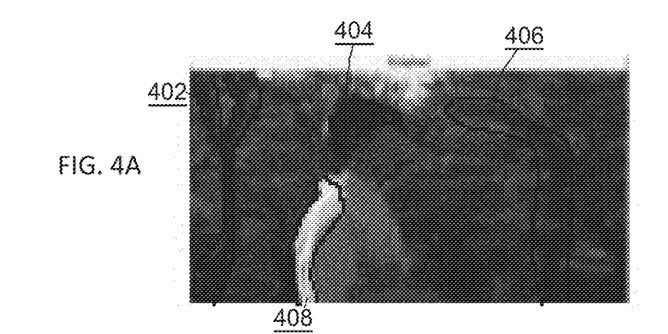
FIGS. 4A, 4B, and 4C illustrate exemplary region of interest processing according to the present disclosure.
Figure 4B:
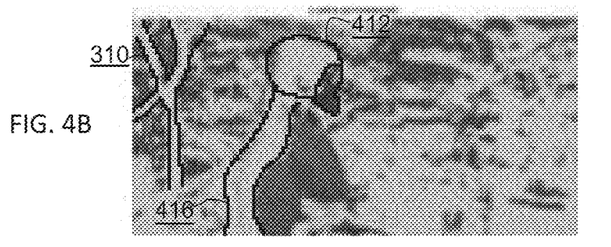
Figure 4C:
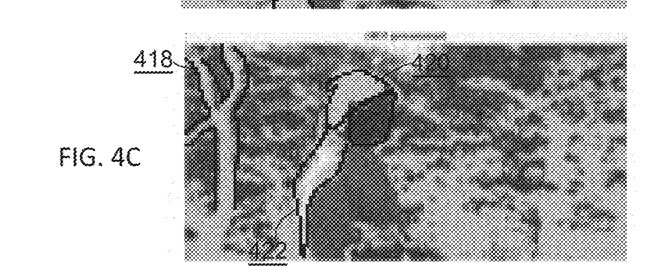

FIGS. 4A-C illustrate applications of skin tone classification techniques to an exemplary input image. FIG. 4A illustrates an input image. FIG. 4B illustrates regions of the image that are likely to be classified as containing an ROI in a first embodiment, where skin tone colors are defined by a range of luma values. In this embodiment, the method 300 (FIG. 3) may compare color values of pixels from the input image against the luma range and identify region(s) of the input image whose pixel values match the range as candidate ROIs. In an embodiment, ROIs need not be assigned to all pixels whose image content matches the defined range of skin tone values; instead, the method 300 first may determine whether the matching pixels define a contiguous region of sufficient spatial area before defining the pixels to constitute an ROI.

FIG. 4C illustrates regions of the image that are likely to be classified as containing an ROI in a second embodiment. In the second embodiment, skin tone colors may be defined as a range of values in a hue, saturation, value (colloquially, "HSV") color space. An input frame may be downscaled and converted from a source representation (for example, RGB) to the HSV colorspace. In this embodiment, the method 300 (FIG. 3) may compare color values of pixels from the converted image against the HSV range that correspond to skin tone to identify region(s) of the input image that qualify as ROIs. Again, ROIs need not be assigned to all pixels whose image content matches the defined range of skin tone values; instead, the method 300 first may determine whether the matching pixels define a contiguous region of sufficient spatial area before defining the pixels to constitute an ROI.

Defining ROIs based on correspondence with skin tone data may provide a further advantage in excluding image content from an ROI that has excessively bright or excessively dark content. Oftentimes, human viewers are less sensitive to coding errors in regions that are extremely bright or extremely dark as compared to other regions having intermediate levels of brightness and darkness. When defining ROIs based on correspondence to skin tone, such excessively bright and dark regions may be filtered naturally from the ROIs.

In another embodiment, ROI definition may be performed by foreground/background segmentation processes. Segmentation may be performed, for example, by estimating depth of content in image data, where regions representing content having a depth representing relatively close content may be classified as foreground objects. ROIs may be defined to include element(s) of frame content that are classified as foreground objects.

An ROI may also be set from an analysis of motion of image content among frames. In one embodiment, a frame may be analyzed to assign an overall direction of motion among frame content. The frame also may be analyzed to identify elements of frame content that has motion different from the motion of the frame. For example, image content may be generated from a panning operation of a camera, which captures an object that is moving with respect to other static elements. In this example, the panning operation may impose a uniform direction of motion on many elements within the field of view of the camera such as background elements and stationary foreground elements, but the moving object, which is kept within the field of view, may have motion that differs from this uniform direction of motion. In this example, the ROI may be defined to include the moving object on the basis of its motion and the difference between its motion and the other elements of image content.

In a further embodiment, ROIs may be defined by metadata provided to the system from external sources. In the case of produced video, for example, the producer may provide metadata that accompanies the source video and expressly identifies regions within the video that are designated as ROIs. The method 300 may use this information in defining the ROI in box 304.

Estimates of coding error for the ROIs (box 306) may be performed by comparing pixels of the decoded ROI data to their counterparts in a source image. Error computation may be performed based on MSE, structural similarity index (SSIM), SAD, and/or Row-Col error calculations. By performing error derivation on the spatial areas of each frame that belong to the ROIs, the method 300 may exclude from computation errors that may exist in portions of frames that are unlikely to draw interest from viewers.

The temporal filtering of errors (box 308) may be performed by filtering error values at each pixel location with the ROIs over the video sequence, for example, by low pass filtering the error values or performing averaging (or weighted averaging) over a sliding window of frames. Typically, such filtering operations will cause attenuation of error values that appear only momentarily across the span of frames being filtered and preservation of error values that remain generally consistent over that span of frames.

Ranking of error values may be performed on a frame-by-frame basis. That is, an aggregate error score may be calculated for each frame from the frame's filtered error values. These aggregate error scores may be used to distinguish frames having relatively high errors from those having relatively lower values errors. A group of frames may be derived from the rankings, for example, as the 90% of frames having the lowest errors or the 80% of frames having the highest error. The frames in the group need not be contiguous in temporal order. The aggregate error value may be developed from this group of frames.

The aggregate error value may be compared to a threshold representing a cutoff for video quality. The threshold value may be a programmable value, which permits users of the method 300 to tune the method 300 for their needs. As indicated, if the aggregate error value meets the predetermined threshold value, the quality of the coded video sequence may be assigned passing grade (box 316). If the scores do not meet the predetermined threshold value, the quality of the coded video sequence may be assigned failing grade (box 318).

In another embodiment, the method 300 may utilize a plurality of thresholds for comparison against the aggregate error value. For example, thresholds may parse a range of possible error values into a 'pass' zone, an intermediate 'unknown' zone and a 'fail' zone.

In a further embodiment, multiple instances of the operations of boxes 306-314 may be performed, each using a different error calculation technique. For example, one instance may use MSE, another may use SSIM, and a third instance may use SAD. The pass/fail determinations of box 314 from each of these instances may be merged into a final determination of whether a given selection of coding parameters has sufficient quality.

In performing the method 300, several other operations may be performed. For example, source data and decoded data may be converted from a source color space (perhaps YCrCb) to grayscale to simplify calculations.

In another embodiment, frames may be cropped in a manner that retains an original aspect ratio center portion of the frame and discards an outer border of predetermined size (perhaps the outer 10% of the image space). Such cropping operations may be performed in applications where there is a low probability of sustained viewer attention to the outer periphery of image content.

In a further embodiment, source frames and decoded frames may be lowpass filtered and/or downscaled by identical factors. Lowpass filtering tends to limit the method's sensitivity to detail, which tends to align with human viewers' sensitivity to detail in impairment detection.

Figure 5A:
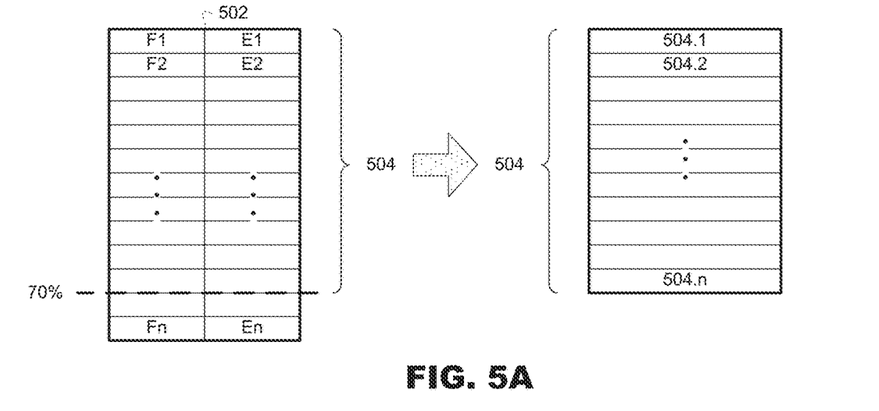
FIGS. 5A, 5B, and 5C illustrate exemplary error handling processes according to the present disclosure.
Figure 5B:
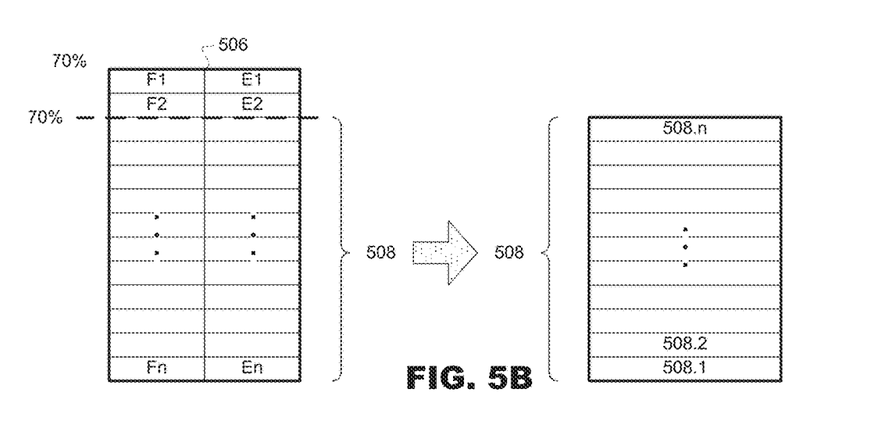
Figure 5C:
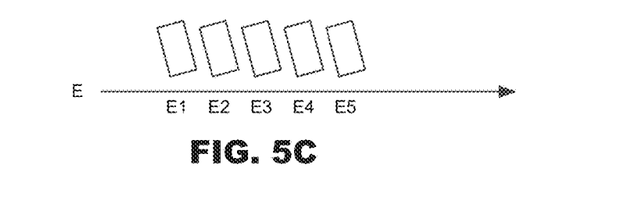

Error evaluation may also be more efficient if a group of coding errors is used to evaluate the overall quality of a video sequence. FIG. 5A illustrates ranking a best percentage of errors (E1-En) of a video sequence 502 based on the frames (F1-Fn) in that video sequence 502, and FIG. 5B illustrates ranking a worst percentage of errors (E1-En) of a video sequence 506 based on the frames (F1-Fn) of the video sequence 506. FIG. 5C illustrates an order of ranked error values (E1-E5).

In FIG. 5A, the best 70% of errors are combined into a group of errors (504.1-504.$n$). Other percentage values representing all or a subset of errors may be used to create groups. The best errors may mean the least amount of error, so the group of errors formed in FIG. 5A may represent the 70% of errors having the least amount of error. Therefore, the overall quality of the video sequence may be based on the best portions of the video sequence rather than the entire video sequence.

Alternatively, as in FIG. 5B, the worst percentage of errors (508.1-508.$n$) within a video sequence may be ranked. The worst coding errors may represent the most amount of error, so the group of errors formed in FIG. 5B may represent the 70% of errors having the most amount of error. Therefore, the overall quality of the video sequence may be based on the worst portions of the video sequence rather than the entire video sequence.

In the example illustrated in FIG. 4C, the errors are shown in an order of E1-E5. The amount of error associated with error amounts E1-E5 may vary. For example, E1-E5 may represent an increasing order of error values, wherein E1 can represent the least amount of error, and E5 can represent the most amount of error. Alternatively, E1-E5 may not represent an exact ascending or descending order of their amount of error (i.e., their error values may or may not be contiguous). Therefore, the best errors (504.1-504.$n$ in FIG. 5A) and the worst errors (508.1-508.*n* in FIG. 5B) may represent some subset of the error values E1-E5 depending on what those values are. If, for example, E1 represents the lowest error and E5 represents the highest error in ascending order from E1-E5, then the best 80% of errors would be E1-E4, and worst 80% of errors would be E5-E2. In another example, the top and bottom 20% of coding errors may be dropped so the group of errors formed represents the middle 60% (e.g., if E1-E5 represents an increasing amount of errors, the group may be E2, E3, and E4).

Figure 6:
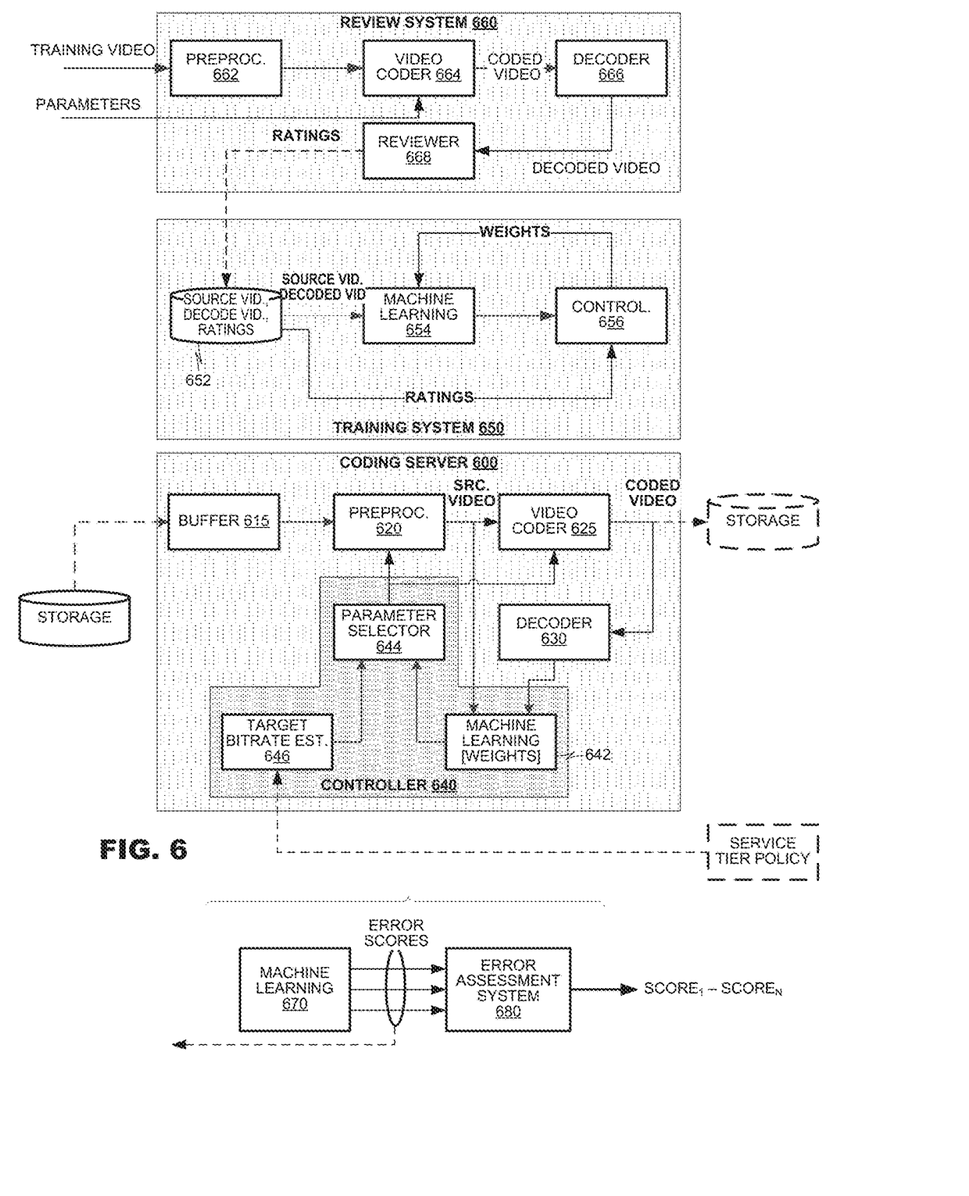
FIG. 6 is a simplified block diagram of a system according to the present disclosure.

FIG. 6 is a simplified block diagram of a coding server 600 according to another embodiment of the present disclosure. The coding server 600 may have a buffer 615, a preprocessor 620, a video coder 625, a video decoder 630, and a controller 640. The buffer 615 may receive video data that is to be coded. The preprocessor 620 may perform operations on the video data that condition the video data for coding. The video coder 625 may perform data compression operations on the video data. The video decoder 630 may invert the data compression operations performed by the video coder 625.

The controller 640 may control operations of the coding server 600. As is relevant to the present discussion, the controller 640 may assess quality of the coding/decoding operations performed by the video coder 625 and the video decoder 630. The controller 640 may determine whether coding operations performed on source video yield coded video data that will possess sufficient coding quality when it is decoded. The controller 640 may validate coded video for release or, alternatively, cause coded video data to be recoded because it does not generate coded video data with sufficient quality.

FIG. 6 illustrates sub-units corresponding to processes performed by the controller 640—a Machine Learning classifier 642, a parameter selector 644, and a target bitrate estimator 646. In the embodiment of FIG. 6, the quality estimator 242 of FIG. 2 may be embodied as Machine Learning classifier 642, which stores weights that define its operation. The Machine Learning classifier 642, or another type of Machine Learning classifier, may receive the source video and the decoded video as inputs and may generate an output representing a rating of the decoded video. For example, the ratings could be "pass" or "fail" to qualify the quality of the video sequence. The ratings may be output to the parameter selector 644, which may determine processing and/or coding parameters based on the ratings.

Alternatively, the Machine Learning classifier 670 may receive the decoded video from the decoder 630 and the weights from the training system 650, and may output one or more error scores to an error assessment system 680. The error scores may represent error calculations based on which measurements are applied to the video data, and may serve as inputs to the error assessment system 680. The error assessment system 680 may determine and output a combination of a PASS/FAIL classification, numeric values representing Estimated Mean Opinion Scores, and various statistics related to a quality assessment provided by the error assessment system 680. The outputs of the error assessment system are represented by $Score_1$-$Score_N$.

In another embodiment of the disclosure, the Machine Learning classifier 670 and error assessment system 680 may be part of the controller 640. In such an embodiment, the error scores from the Machine Learning classifier 670 may also be provided to the controller 640 in a feedback loop for further quality assessment.

The parameter selector 644 may generate parameter data to the preprocessor 620 and/or video coder 625 to govern their operation. The parameter selector 644, for example, may cause the preprocessor 620 to alter the data output to the video coder 625. The parameter selector 644 may impose coding modes and/or quantization parameters to the video coder 625. The parameter selector 644 may select the coding parameters at least in part based on bit rate estimates received from the target bitrate estimator 646, and based on ratings provided by the Machine Learning classifier 642. If, for example, the ratings from the Machine Learning classifier 642 are sufficient (e.g., pass), the controller 640 may validate coded video for release. Alternatively, if the ratings from the Machine Learning classifier 642 are insufficient (e.g., fail), the controller 640 may cause coded video data to be recoded and/or processed because it does not generate coded video data with sufficient quality.

The weights used by the Machine Learning classifier 642 may be received from a training system 650. The training system 650 may store source video, decoded video, and ratings in a storage device 652. The source video and decoded video may be provided to a Machine Learning classifier 654 associated with the training system 650. The ratings may be provided to a controller 656 of the training system 650. The Machine Learning classifier 654 may provide ratings of the video sequence based on weights received from the controller 656. The ratings may be numeric or qualitative assessments such as PASS/FAIL. The controller 656 may adjust weights based on the ratings provided by the Machine Learning classifier 654 and the storage device 652. For example, if the video sequence ratings from the storage device 652 and the Machine Learning classifier 654 do not match, the controller 556 may adjust the weights provided to the Machine Learning classifier 654 to yield ratings which match the ratings of the video sequence from the storage device 652. Once the ratings match, the weights used by the Machine Learning classifier 654 to produce the matching ratings may be provided to the Machine Learning classifier 642 of the coding server 600.

The ratings used in the training system 650 and stored in the storage device 652 may be provided by a review system 660. The review system 660 may have a preprocessor 662, a video coder 664, a video decoder 666, and a reviewer 668. The preprocessor 662 may receive a training video and perform preprocessing operations on the video before coding. The video coder 664 may then perform coding operations on the video based on coding parameters which may be input to the video coder 664. The video decoder 666 may invert the data compression operations performed by the video coder 664. The reviewer 668 may evaluate the decoded video for its quality. Based on the quality evaluation, the reviewer 668 may output ratings such as "pass" and "fail" to the training system 650. The reviewer 668 may be a human reviewer who watches the decoded video and provides the ratings.

Figure 7:
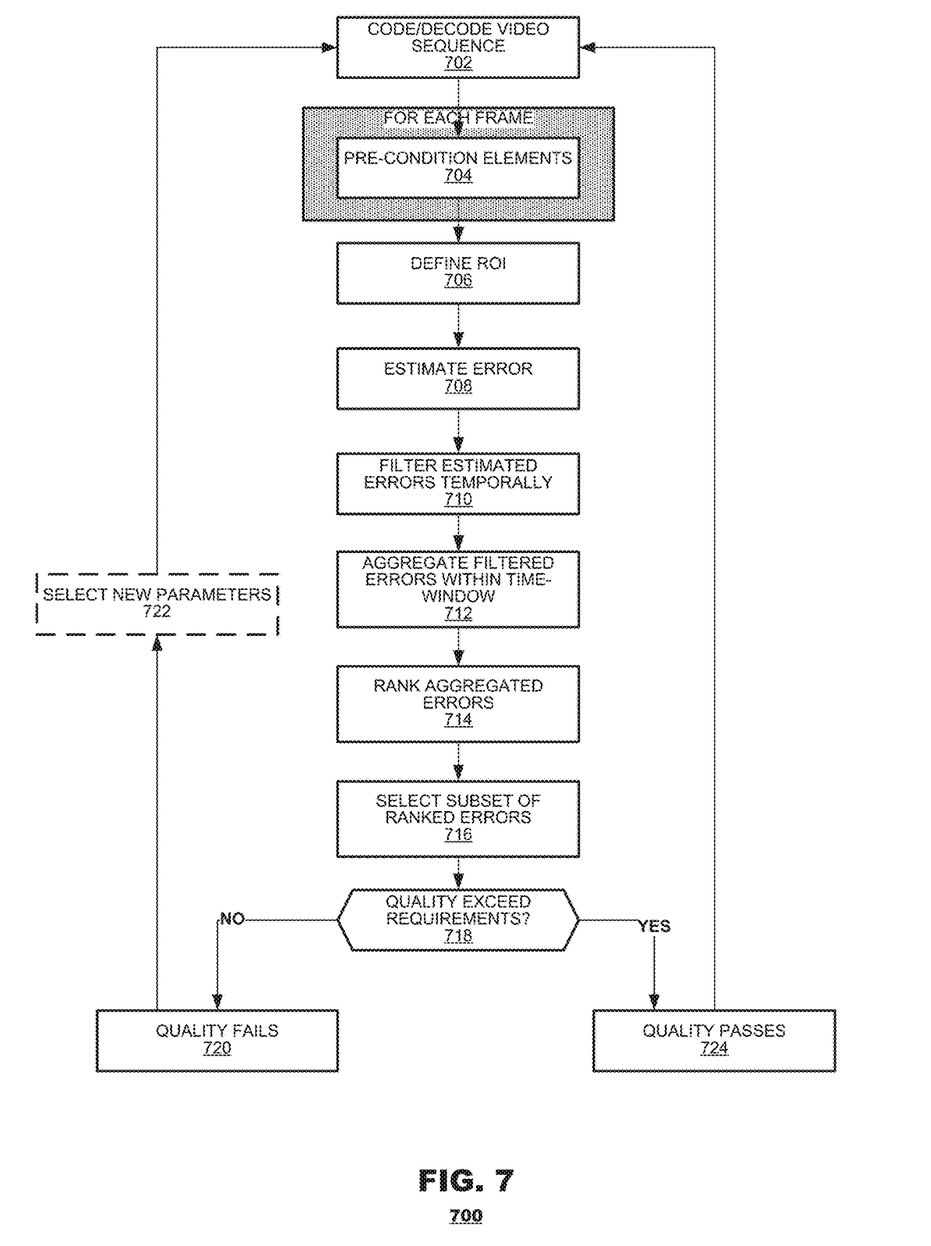
FIG. 7 illustrates a method for assessing quality of coded video according to the present disclosure.

FIG. 7 illustrates a method 700 for assessing quality of video according to the present disclosure. The method 700 may begin by coding a video sequence of a video frame according to a first set of coding parameters, then decoding the video sequence (box 702). Next, the method 700 may, for each frame, pre-condition elements of the frame (box 704), define an ROI (box 706), and estimate error associated with the ROI (box 708). The method 700 may also filter estimated error temporally within the ROI (box 710). Next, the method 700 may aggregate filtered errors (box 712). The method may continue by ranking the aggregated errors (box 714) and then selecting a subset of ranked errors (716). Based on the selected ranked errors, the method 700 may determine whether the quality of the video data exceeds quality requirements (box 718). If the quality score exceeds the quality requirements threshold, the video sequence may be given a passing grade (box 724). If not, the video sequence may be given a failing grade (box 720). In an embodiment, new parameters may be selected (box 722) and the method 700 may be repeated when a video fails to meet the quality requirements threshold.

Pre-conditioning (box 704) may include filters and/or color space transformations such as those discussed in connection with FIGS. 4A-4C. ROIs may be determined (box 706) according to a variety of techniques such as those discussed in connection with FIG. 3. Error may be estimated (box 708) in a variety of ways such as those discussed in connection with FIG. 3. The temporal filtering of errors (box 710) may be performed in a variety of ways such as those disclosed in connection with FIG. 3. Ranking aggregated errors (box 714) and selecting a subset of ranked errors (box 716) may be performed according to the techniques described in connection with FIGS. 5A-5C. Determining the quality of video (box 718) may be performed by a Machine Learning classifier such as a neural network or an error assessment system as described in connection with FIG. 6. The quality assessment (box 718) may consider both PASS/FAIL classifications and Estimated Mean Opinion Score numeric regression values.

Aspects of the disclosure may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

Aspects of the disclosure may include a server executing an instance of an application or software configured to accept requests from a client and provide responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

A server may operate a web application in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like.

Further in accordance with various aspects of the disclosure, the methods described herein are intended for operation with dedicated hardware implementations including, but not limited to, PCs, tablets, semiconductors, application specific integrated circuits (ASIC), programmable logic arrays, cloud computing devices, and other hardware devices constructed to implement the methods described herein.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

The embodiments of the disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals represent similar parts throughout the several views of the drawings.

We claim:

1. A video quality assessment method comprising:
    for each frame of a reference video sequence and a test video sequence, defining a region of interest in the frames of the test video sequence;
    estimating error between the reference video sequence and the test video sequence within the region of interest;
    filtering the estimated errors of the region of interest temporally across adjacent frames within a time window;
    aggregating the filtered errors within the time window;
    ranking the aggregated errors;
    selecting a subset of the ranked errors as an aggregate error score for the test video sequence; and
    determining at least one of the following with an error assessment system based on the selected subset of the ranked errors: a quality classification and a quality assessment.

2. The method of claim 1, further comprising applying at least one of filters and color-space transformations to the test video sequence.

3. The method of claim 1, further comprising releasing the test video sequence for distribution when the quality classification exceeds a predetermined threshold.

4. The method of claim 1, wherein the region of interest is defined by comparing image content of the reference video sequence from which the test video sequence was derived to a range of content corresponding to an object of interest.

5. The method of claim 1, wherein the region of interest is defined from object detection.

6. The method of claim 1, wherein the region of interest is defined from skin tone detection.

7. The method of claim 1, wherein the region of interest is defined by a comparison of motion among elements in a source sequence from which the test video sequence was derived.

8. The method of claim 1, wherein the region of interest is defined from depth estimation of content in the reference video sequence from which the test video sequence was derived.

9. A video coding method comprising:
defining a region of interest of a test video sequence;
estimating error between the reference video sequence and the test video sequence within the region of interest;
filtering the estimated error at each pixel location within the region of interest temporally;
developing an aggregate error score for the test video sequence from a subset of frames based on a ranking of the frames' filtered error values; and
assessing quality of the video sequence from the aggregate error score.

10. The method of claim 9, further comprising recoding the test video sequence using new coding parameters for the test video sequence when the assessed quality falls below a predetermined threshold.

11. The method of claim 9, further comprising releasing the test video sequence for distribution when the assessed quality exceeds a predetermined threshold.

12. The method of claim 9, wherein the subset is developed from a predetermined number of coded frames in the test video sequence having a lowest overall error value.

13. The method of claim 9, wherein the subset is developed from a predetermined number of coded frames in the test video sequence having a highest overall error value.

14. The method of claim 9, further comprising performing multiple instances of the estimating, filtering, developing and assessing, wherein each instance of estimating error uses a different error estimating technique.

15. The method of claim 9, wherein the region of interest is defined by comparing image content of a reference video sequence from which the test video sequence was derived to a range of content corresponding to an object of interest.

16. The method of claim 9, wherein the region of interest is defined from object detection.

17. The method of claim 9, wherein the region of interest is defined from skin tone detection.

18. The method of claim 9, wherein the region of interest is defined by a comparison of motion among elements in a reference video sequence from which the test video sequence was derived.

19. The method of claim 9, wherein the region of interest is defined from depth estimation of content in a reference video sequence from which the test video sequence was derived.

20. The method of claim 9, wherein the assessing is based on a quality rating output from a Machine Learning classifier.

21. A video coder, comprising:
a controller; and
a memory storing instructions that, when executed by the controller, cause the controller to:
define a region of interest of a test video sequence;
estimate error within the region of interest between the reference video sequence and the test video sequence;
filter the estimated error at each pixel location within the region of interest temporally;
develop an aggregate error score for the test video sequence from a subset of frames based on a ranking of the frames' filtered error values; and
assess quality of the test video sequence from the aggregate error score.

22. A non-transitory computer readable medium having instructions that, when executed by a processing device, cause the device to:
define a region of interest of a test video sequence;
estimate error within the region of interest between the reference video sequence and the test video sequence;
filter the estimated error at each pixel location within the region of interest temporally;
develop an aggregate error score for the test video sequence from a subset of frames based on a ranking of the frames' filtered error values; and
assess quality of the test video sequence from the aggregate error score.

23. The medium of claim 22, wherein the instructions further cause the device to recode the test video sequence using new coding parameters for the test video sequence when the assessed quality falls below a predetermined threshold.

24. The medium of claim 22, wherein the instructions further cause the device to release the test video sequence for distribution when the assessed quality exceeds a predetermined threshold.

25. The medium of claim 22, wherein the subset is developed from a predetermined number of coded frames in the test video sequence having a lowest overall error value.

26. The medium of claim 22, wherein the subset is developed from a predetermined number of coded frames in the test video sequence having a highest overall error value.

27. The medium of claim 22, wherein the instructions further cause the device to perform multiple instances of the estimating, filtering, developing and assessing, wherein each instance of estimating error uses a different error estimating technique.

28. The medium of claim 22, wherein the region of interest is defined by comparing image content of a reference video sequence from which the test video sequence was derived to a range of content corresponding to an object of interest.

29. The medium of claim 22, wherein the region of interest is defined from object detection.

30. The medium of claim 22, wherein the region of interest is defined by a comparison of motion among elements in a reference video sequence from which the test video sequence was derived.

31. The medium of claim 22, wherein the region of interest is defined from depth estimation of content in a reference video sequence from which the test video sequence was derived.

32. The medium of claim 22, wherein the region of interest is defined from skin tone detection.

33. The medium of claim 22, wherein the assessing is based on a quality rating output from a Machine Learning classifier.

* * * * *